United States Patent
Hegenbart et al.

(10) Patent No.: US 11,052,487 B2
(45) Date of Patent: Jul. 6, 2021

(54) METHOD, USE, SYSTEM AND MOBILE LASER SHOCK TREATMENT STATION FOR LASER SHOCK PEENING OF A COMPONENT

(71) Applicant: Airbus Operations GmbH, Hamburg (DE)

(72) Inventors: Matthias Hegenbart, Ahlerstedt (DE); Peter Linde, Buxtehude (DE)

(73) Assignee: Airbus Operations GmbH

( * ) Notice: Subject to any disclaimer, the term of this patent is extended or adjusted under 35 U.S.C. 154(b) by 252 days.

(21) Appl. No.: 16/150,706

(22) Filed: Oct. 3, 2018

(65) Prior Publication Data

US 2019/0118302 A1    Apr. 25, 2019

(30) Foreign Application Priority Data

Oct. 25, 2017 (DE) ...................... 10 2017 219 019.1

(51) Int. Cl.
| | |
|---|---|
| *B23K 26/00* | (2014.01) |
| *B23K 26/356* | (2014.01) |
| *B64F 5/40* | (2017.01) |
| *C21D 10/00* | (2006.01) |

(52) U.S. Cl.
CPC .............. *B23K 26/356* (2015.10); *B64F 5/40* (2017.01); *C21D 10/005* (2013.01)

(58) Field of Classification Search
CPC ............ B23K 26/0604; B23K 26/0608; B23K 26/356; B64F 5/40; C21D 10/005
USPC .......................................... 219/121.6–121.86
See application file for complete search history.

(56) References Cited

U.S. PATENT DOCUMENTS

| | | | |
|---|---|---|---|
| 3,850,698 A | 11/1974 | Mallozzi et al. | |
| 4,401,477 A | 8/1983 | Clauer et al. | |
| 6,288,358 B1 * | 9/2001 | Dulaney .............. | B23K 26/032 219/121.6 |

(Continued)

FOREIGN PATENT DOCUMENTS

| | | |
|---|---|---|
| EP | 0 094 912 B1 | 12/1986 |
| WO | 2010/063643 A1 | 6/2010 |

OTHER PUBLICATIONS

Gissibl et al., Sub-micrometre accurate free-form optics by three-dimensional printing on single-mode fibres, Nature Communications (2016) p. 1-9, URL: https://www.nature.com/articles/ncomms11763.pdf.

(Continued)

*Primary Examiner* — Sang Y Paik
(74) *Attorney, Agent, or Firm* — Lerner, David, Littenberg, Krumholz & Mentlik, LLP

(57) ABSTRACT

A method for laser shock peening of a component, in particular at points that are difficult to access, includes the steps of: supplying a first end of a flexible optical waveguide, which end is designed in the form of an optical waveguide brush having a plurality of divergent optical waveguide fibres, to a point of the component to be treated by laser shock peening; generating laser shock pulses, which are coupled in at a second end of the optical waveguide, by a laser beam source; and discharging the laser shock pulses by the optical waveguide brush into a process zone at the point of the component to be treated. A use of an optical waveguide brush, a system for laser shock peening of a component, and a mobile laser shock treatment station are also described.

17 Claims, 13 Drawing Sheets

(56) References Cited

U.S. PATENT DOCUMENTS

| | | | |
|---|---|---|---|
| 6,818,854 B2 * | 11/2004 | Friedman | B23K 26/0604 219/121.6 |
| 2002/0159139 A1 * | 10/2002 | Koplow | H01S 3/06754 359/342 |
| 2011/0290770 A1 | 12/2011 | Steinwandel et al. | |

OTHER PUBLICATIONS

Gissibl et al., Two-photon direct laser writing of ultracompact multi-lens objectives, Nature Photonics vol. 10 (Aug. 2016) p. 554-560, https://www.nature.com/articles/nphoton.2016.121.

Heshmat et al., Optical brush: Imaging through permuted probes, Scientific Reports (2016) p. 1-9, URL: https://www.nature.com/articles/sre p20217.pdf.

Serio et al., Looking at the nanoscale: scanning near-field optical microscopy, Trends in Analytical Chemistry, vol. 22, No. 2 (2003) p. 70-77, URL: https://www.sciencedirect.com/science/article/pii/80165993603002012.

\* cited by examiner

METHOD, USE, SYSTEM AND MOBILE LASER SHOCK TREATMENT STATION FOR LASER SHOCK PEENING OF A COMPONENT

FIELD OF THE INVENTION

The present invention relates to a method for laser shock peening of a component, in particular at points that are difficult to access, to a use of a plurality of optical waveguide brushes having divergent optical waveguide fibres for laser shock peening of a component, to a system for laser shock peening of a component and to a mobile laser shock treatment station for carrying out repairs or retrofitting by means of laser shock peening.

BACKGROUND OF THE INVENTION

Laser shock peening is a laser-beam-based surface treatment technique used predominantly on metal materials for specifically improving material properties by introducing compressive prestresses. For this purpose, the surface of a component is processed by means of laser shock peening. A typical assembly 100 for laser shock peening is shown for example in FIG. 1. Typically, radiation pulses 101 from a laser source 102 that is pulsed at high power are used to produce shockwaves on the surface of a component 103. By means of the pulsed laser beam directed onto the component surface, a strong local pressure force is produced on a treated portion 104. During ablation or evaporation of a thin layer of the surface or a coating, a strongly expanding plasma 105 results at the point of impingement of the laser beam 101, as a result of which an explosive force is produced. The pressure pulse from the rapidly expanding plasma 105 produces a shockwave 106 that enters the component. Said pressure shockwave 106 created by the laser beam pulse leads to plastic pressure deformations in the component 103. The plastic deformations cause desirable compressive residual stresses in the material. Laser shock peening is described for example in U.S. Pat. No. 3,850,698 A or 4,401,477 A.

Laser shock peening is occasionally used to apply pressure to a layer 107, as shown in FIG. 2, on the outer surface of a component 103, such that the resilience of the workpiece can be substantially improved. In contrast with conventional surface beam technologies, for example shot peening, in which a blast medium is directed onto the point to be treated until a saturation time is reached, at which point a desirable surface hardening is achieved, in laser shock peening, an outer surface of a component is intermittently impinged by pulsed laser beams 101 in a structured manner according to a predetermined grid. Overlapping laser-beam impact zones 108 are therefore formed on the surface of the component 103. Grids of this kind are shown in FIGS. 3 and 4, for example. In FIG. 3, the impact zones 108 overlap multiple times and in two dimensions, such that a uniform, matrix-like structure results. According to FIG. 4, the impact zones 108 overlap in only one dimension, such that impact zones 108 overlapping a plurality of parallel lines are formed. For this purpose, for example, the component 103 to be treated can be moved in a meandering manner under a laser beam optic, as indicated by the movement arrows 109 shown.

A laser shock peening technique of this kind is occasionally used in production, in particular for adapting material parameters, but also for the purpose of repairs, in particular to prevent the progression of cracks. WO 2010/063643 for example describes the use of laser shock peening for avoiding crack formation in metal aircraft structures, for which purpose a surface region surrounding a damaged point is treated by means of laser shock peening.

In most cases, a protective layer 110 is occasionally applied to the surface to be treated, as shown in FIG. 2. The protective layer 110 is often glass or water wetting. In order to realise the grid, it is usually necessary to guide the component or the laser beam head with a robot.

Furthermore, in the field of videoendoscopy, there are what are known as optical waveguide brushes 111. Said brushes are opened bundles of optical waveguide fibres 112 for capturing images, it being possible in particular for the brush to be a fanned-out fibre bundle of an optical waveguide cable 113 having random distribution of the individual fibres, as is shown in an exemplary manner in FIG. 5. The image segments recorded for the videoendoscopy by individual, randomly distributed fibres are analysed by means of specific algorithms and put together to form an overall image. This mode of operation is described for example in Heshmat, B. et al. Optical brush: Imaging through permuted probes. Sci. Rep. 6, 20217; DOI: 0.1038/srep20217.

BRIEF SUMMARY OF THE INVENTION

Against this background, one of the ideas of the present invention is to provide an improved technique for laser shock peening of a component, in particular at points that are difficult to access.

Accordingly, the following is provided:

A method for laser shock peening of a component, in particular at points that are difficult to access, comprising the steps: supplying a first end of a flexible optical waveguide, which end is designed in the form of an optical waveguide brush having a plurality of divergent optical waveguide fibres, to a point of the component to be treated by means of laser shock peening; generating laser shock pulses, which are coupled in at a second end of the optical waveguide, by means of a laser beam source; and discharging the laser shock pulses by means of the optical waveguide brush into a process zone at the point of the component to be treated.

A use of an optical waveguide brush having a plurality of divergent optical waveguide fibres for laser shock peening of a component, in particular by means of a method according to the invention.

A system for laser shock peening of a component, in particular by means of a method according to the invention, comprising: a laser beam source which provides an energy density and pulse duration that are suitable for laser shock pulses; a flexible optical waveguide which has a first end and a second end, wherein the first end has an optical waveguide brush that has a plurality of divergent optical waveguide fibres and the second end can be connected to the laser beam source in order to couple in laser shock pulses, wherein the first end of the optical waveguide can be flexibly positioned at a point of the component to be treated by means of laser shock peening, such that laser shock pulses that can be emitted by the laser beam source can be discharged by the optical waveguide brush into a process zone at the point of the component to be treated.

A mobile laser shock treatment station for carrying out repairs or retrofitting by means of laser shock peening, in particular on aircraft or spacecraft, which station has a mobile vehicle and a system according to any of claims 10 to 13.

A concept on which the present invention is based consists in, for the purpose of laser shock peening, an optical waveguide brush that can be used according to the saturation principle and comprises a plurality of divergent optical waveguide fibres instead of a previously conventional grid-like impingement of a component surface by means of a typical laser beam optic. Said brush is used in an entirely novel manner, i.e. specifically not primarily to captures images, but to emit laser shock pulses. Furthermore, laser shock peening is therefore used according to the saturation principle for the first time and is accordingly used in this way for the first time.

By virtue of the flexible optical waveguide which is provided together with the optical waveguide brush and has a thin, cable-like design, points of a component that are difficult to access can advantageously also be reached in a simple and flexible manner. In particular, points that cannot be reached by conventional laser optics can therefore be penetrated. For example, narrow points and undercuts can thus be reached in a simple manner and treated by means of laser shock peening, which is not possible with conventional systems technology, in particular previously used laser beam heads on account of the dimensions thereof. Advantageously, the spectrum of applications for laser shock technology can be expanded in this way. In addition, the practical application of laser shock technology can be significantly simplified since the treatment no longer requires a high-precision path to be followed that until now had to have a precision within the focal diameter of the laser beam in order to correspond to the predetermined grid. Instead, on account of the fibres being randomly distributed, a statistical saturation can now be set by a corresponding treatment duration of a predetermined surface region, using substantially lower positional precision, in a similar way to conventional surface treatment techniques.

An opened bundle of optical fibres of an optical waveguide cable can be used as the optical waveguide brush, for example. The fibres are designed in such a way that they transmit high-energy laser beam pulses and are thus suitable for the application of laser shock beams. The optical waveguide brush has a predetermined aperture angle for the plurality of individual fibres, for example between 10 and 180°, preferably between 20 and 90°, such that, in comparison with the fibre diameter, a relatively large surface area of the component can advantageously be treated at the same time. This is particularly advantageous over the single-point methods typically used until now.

Advantageous embodiments and developments will emerge from the further dependent claims and the description, with reference to the drawings.

According to one development of the method according to the invention, the laser shock pulses can be discharged for a predetermined time period at the point of the component to be treated, until a predetermined saturation state of a laser shock treatment is reached. Advantageously, the process can be controlled in this way in a simple manner.

According to one embodiment of the method, the fibre ends of the plurality of divergent optical waveguide fibres of the optical waveguide brush can have a disordered distribution. The laser shock pulses are therefore discharged into the process zone in accordance with a disordered distribution of this kind. The discharge therefore takes place in a gridless or statistical manner. Advantageously, the distribution of the optical waveguide fibres, and thus also the impact zones of the laser shock pulses, is carried out statistically over a comparatively large area, such that, within the range of a standard deviation, a static treatment can be performed in a time-dependent manner up to a saturation state, without a particularly high positional precision being necessary for this purpose. Larger surface areas can therefore be treated by means of a process that is very easy to manage and can be controlled simply over the treatment duration.

In another embodiment, the optical waveguide is guided in an endoscope shaft at least in portions and the supply is performed endoscopically. Particularly advantageously, the first end of the optical waveguide can therefore be supplied to points that are difficult to access, in particular in cavities and at undercut regions, and in particular can also still be orientated in a flexible manner inside said points that are difficult to access. The endoscope shaft comprises in particular directing means, for example in the form of Bowden cables which allow a flexible orientation of the endoscope shaft, at least in the region of the first end. Alternatively or additionally to Bowden cables, directing means in the form of actuators or the like integrated in the cover would also be conceivable.

According to one advantageous embodiment, the individual optical waveguide fibres each have focusing means. The position of the process zone relative to a focus of the laser beam is checked prior to the emission of laser shock pulses. The focusing means can be different types of microlenses, for example. In particular, every individual optical fibre can be provided with a focusing means. Therefore, optionally, an average value of the focus position can be used to check the position of the process zone. Advantageously, the first end of the optical waveguide can therefore be positioned such that the process zone is as close as possible to, or in, the focus position of the individual optical waveguide fibres of the optical waveguide brush.

In another embodiment, the supply comprises positioning a mobile vehicle, which transports the laser beam source, close to the component to be treated. It also comprises flexibly supplying the first end of the optical waveguide from the laser beam source that can be transported by the vehicle to the point of the component to be treated by means of laser shock peening, in particular by flexibly unrolling the optical waveguide from an optical waveguide roll. Particularly advantageously, costly equipment that has previously been conventional, in particular laser beam guidance systems and optics at the points to be treated can be dispensed with. This advantageously allows a very much more flexible use of the laser shock peening, in particular for the subsequent treatment or repair in situ, i.e. in the installed state of the component to be treated.

In one development of the use according to the invention, the optical waveguide brush is used in conjunction with a flexible optical waveguide by means of a mobile laser shock treatment station for carrying out repairs or retrofitting by means of laser shock peening, in particular on aircraft or spacecraft. In particular, on account of the dimensions of aircraft or spacecraft, this is particularly advantageous since, instead of transporting the component to the system technology for laser shock peening as has previously been conventional, the system technology can now be transported to the component at the installation site thereof. This nullifies or in any case significantly reduces the assembly time required for installations and upgrades, and also avoids transport distances.

In another advantageous embodiment of the use, the optical waveguide brush is used in conjunction with a flexible optical waveguide guided in an endoscope shaft for laser shock peening of regions of a three-dimensional component that are difficult to access. In particular, this can relate to undercut regions. For example, the system is preferably used in cavities of additively manufactured components which can be formed in almost any way by means of additive manufacturing or can be formed in an undercut manner with almost no consideration for manufacturability. For this purpose, the system requires merely one access opening through which the endoscope shaft passes. The endoscope can then be guided so as to adapt to the shape of the cavity. Particularly advantageously, this allows a full-surface treatment of complex three-dimensional components by means of laser shock peening. This opens up new avenues for the construction and design of complexly formed three-dimensional components.

According to one advantageous embodiment of a system for laser shock peening, the flexible optical waveguide is guided in an endoscope shaft at least in portions. The first end of the optical waveguide can therefore advantageously be orientated towards the point to be treated, in particular even when said point is difficult to access.

Alternatively or additionally, the optical waveguide fibres of the optical waveguide brush are each provided, at the individual fibre ends, with focusing means, in particular each being provided with a focusing device formed within the fibre diameter. For example, in this case it can be a microlens that is directly connected to the optical waveguide fibres. Advantageously, therefore, the optical waveguide brush can be orientated to a process zone, thus allowing effective laser shock treatment.

In one development, the flexible optical waveguide is guided in a working channel of a videoendoscope which has a recording device. Advantageously, therefore, it is possible to revert back to simple systems in which merely the flexible optical waveguide is integrated. In addition to the working channel, a videoendoscope usually has an illumination channel for illuminating and a transmission channel for image transmission by means of the recording device. Advantageously, the first end of the flexible optical waveguide can thus be orientated such that it can be controlled and influenced.

In another embodiment, the flexible optical waveguide is designed to transmit images from the process zone to a recording device and to transmit laser shock pulses from the laser beam source into the process zone. Advantageously, therefore, there is no need for an additional image transmission channel in the endoscope shaft. Instead, as is the case with the videoendoscopy together with the optical waveguide brush, the image segments recorded by the individual, randomly distributed fibres are analysed by means of a suitable algorithm and put together to form an overall image. Particularly advantageously, an optical waveguide can therefore function in two directions, it being used initially to control the position and orientate for the purpose of image transmission and subsequently to transmit the laser shock pulses in the opposite direction. In order to transmit images at dark points, some of the optical waveguide fibres can for example be used to transmit illuminating light and some of the optical waveguide fibres can simultaneously be used to transmit images.

In one advantageous embodiment, the recording device is designed, starting from the first end of the optical waveguide, to detect a focus position of the process zone. In the case of image transmission via the flexible optical waveguide, the focus position can for example be derived from a sharpness of the received image. In the case of videoendoscopy, it would also be conceivable to additionally provide a distance sensor or a second camera for determining distance.

In one advantageous embodiment of a mobile laser shock treatment station, the laser beam source can be transported by the mobile vehicle to the component to be treated. This can be a ground vehicle, for example. Furthermore, the first end of the optical waveguide, starting from the laser beam source that can be transported by the vehicle, can be flexibly supplied to a point of the component that is to be treated by means of laser shock peening. In particular for technical laser beam tools in the wavelength range of less than 4 μm, a flexible supply of this kind is possible by using what are known as optical waveguide cables. Accordingly, the wavelength of the laser beam source is likewise in the range of less than 4 μm, for example between 500 and 1200 nm, which is the typical wavelength range of technical solid-state lasers. If required, the optical waveguide can in particular be unwound from an optical waveguide roll for the purpose of the flexible supply.

The above-mentioned embodiments and developments can, where appropriate, be combined with one another as desired. Further possible embodiments, developments and implementations of the invention also comprise combinations that have not been explicitly stated of features of the invention that have been described previously or in the following in relation to the embodiments. In particular, a person skilled in the art will add individual aspects as improvements or additions to the basic form of the present invention.

BRIEF DESCRIPTION OF THE DRAWINGS

The present invention will be described in more detail in the following with reference to embodiments that are shown in the schematic drawings, in which.

DETAILED DESCRIPTION

Figure 1:
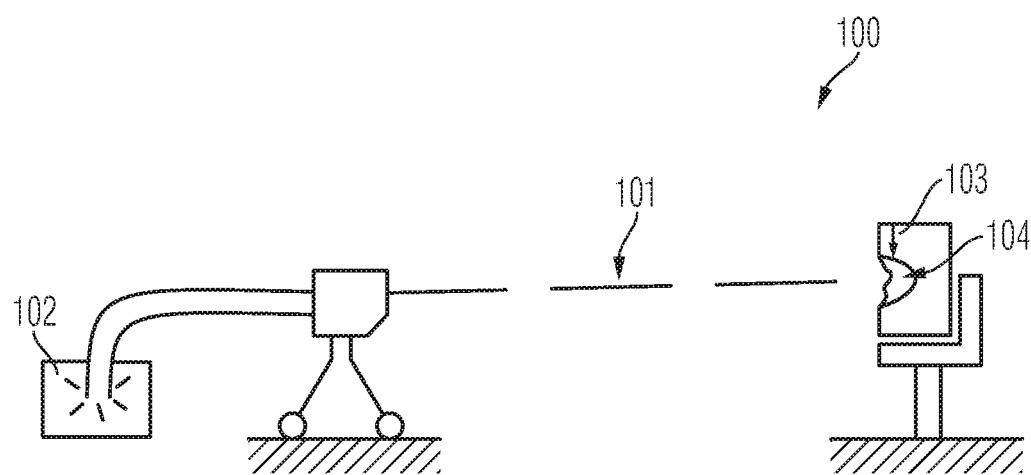
FIG. 1 schematically shows a conventional system for laser shock peening.
Figure 2:
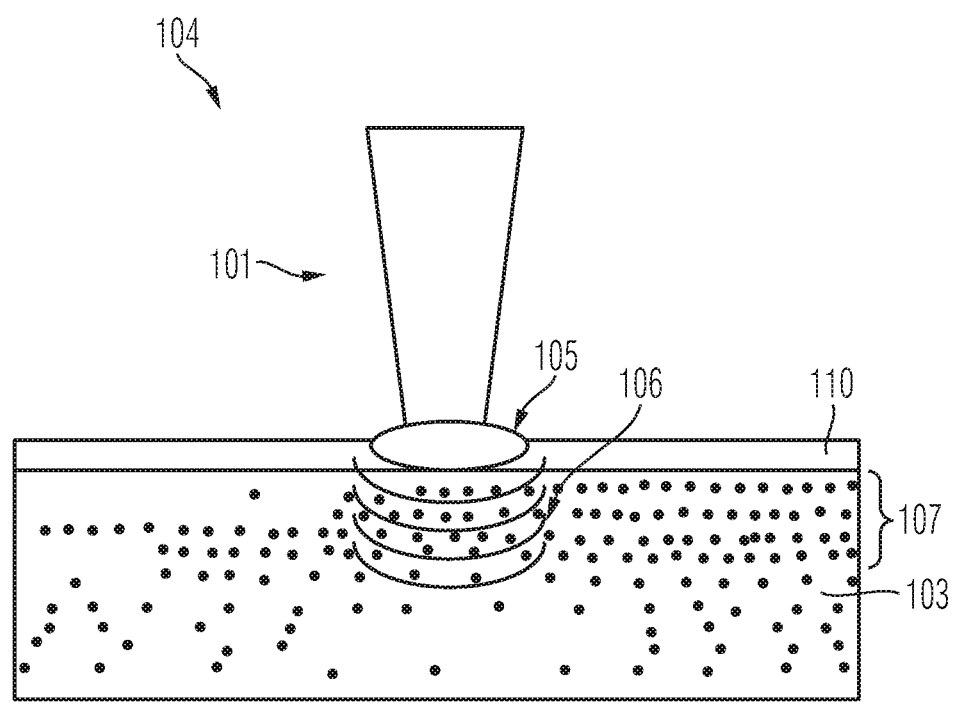
FIG. 2 schematically shows the laser shock process.
Figure 3:
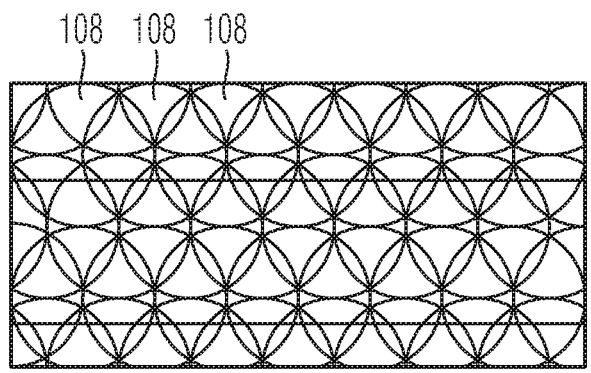
FIG. 3 schematically shows a grid for laser shock peening.
Figure 4:
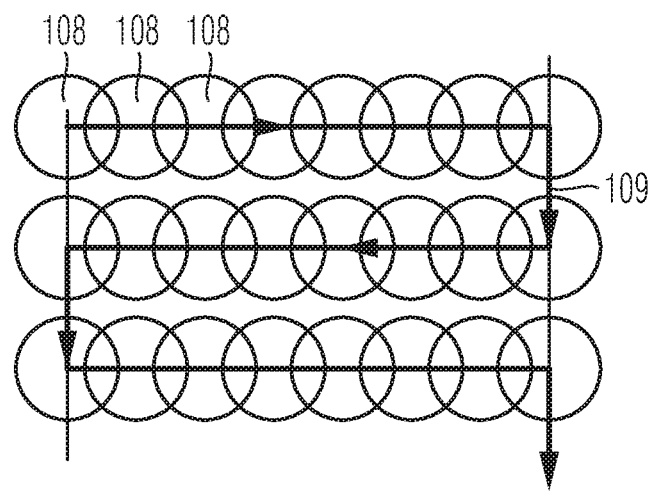
FIG. 4 schematically shows a further grid for laser shock peening.
Figure 5:
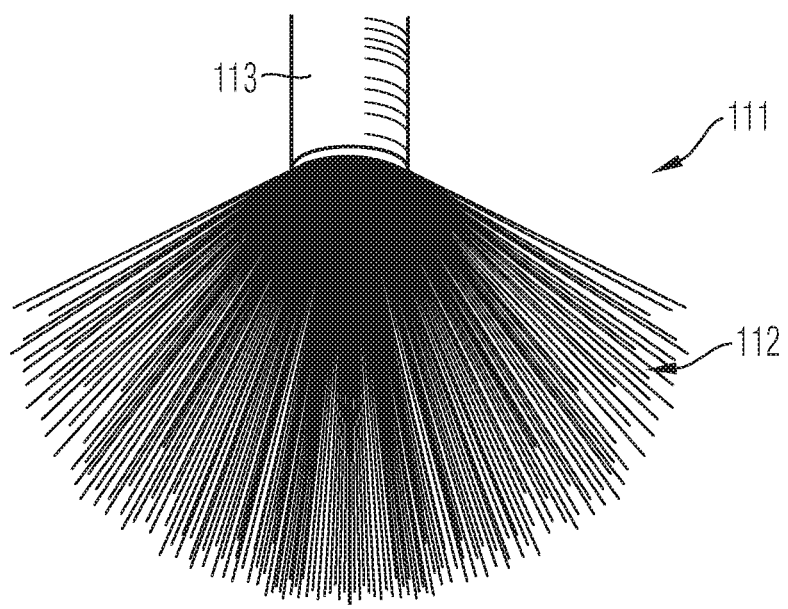
FIG. 5 schematically shows an optical waveguide brush for videoendoscopy.

The appended drawings are intended to impart further understanding of the embodiments of the invention. Said drawings illustrate embodiments and are used in conjunction with the description to explain principles and concepts of the invention. Other embodiments and many of the stated advantages emerge with regard to the drawings. The elements in the drawings are not necessarily shown to scale.

In the drawings—unless stated otherwise—elements, features and components that are the same, functionally the same or effectively the same are provided with the same reference signs.

Laser shock peening (LSP), also referred to as laser peening (LP), is a surface engineering process for generating favourable internal stresses in materials. The deep compressive internal stresses induced by laser shock peening improve the resistance of materials against surface-related defects, e.g. fatigue, frictional vibrations and stress corrosion cracking. The physics of the laser shock peening process can also be used to strengthen thin sections, to work-harden surfaces, to form or adjust parts (laser peen forming), to comminute hard materials, to compact powder metals and for other applications in which high pressures and temporary shockwaves produce desirable processing results.

Figure 6:
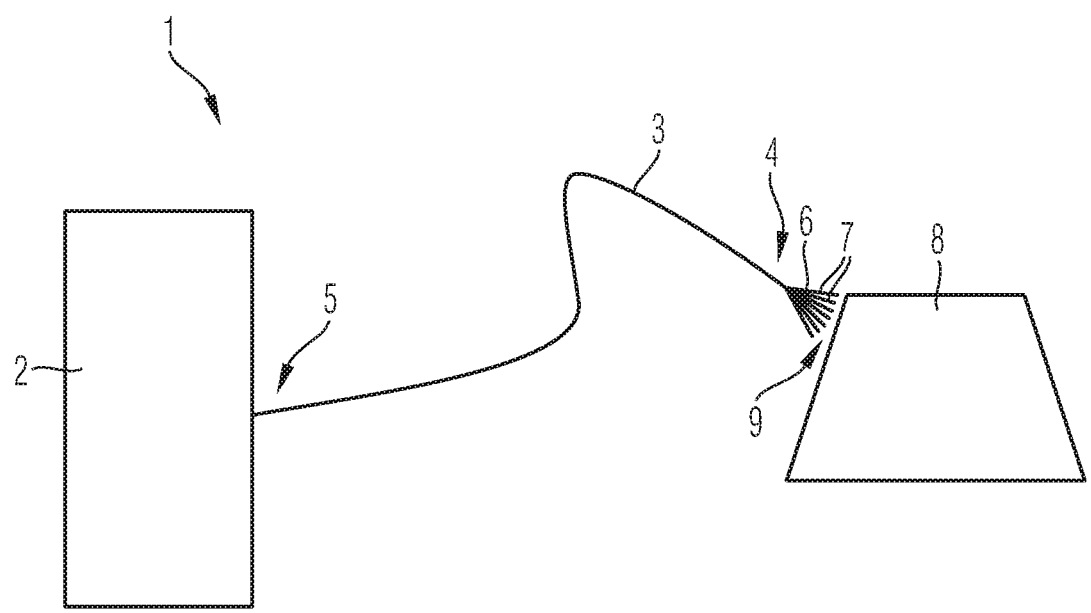
FIG. 6 schematically shows a system for laser shock peening.

The system for laser shock peening shown schematically in FIG. 6 comprises a laser beam source 2 and a flexible optical waveguide 3. The optical waveguide 3 has a first end 4 and a second end 5, the first end 4 being provided with an optical waveguide brush 6. Said optical waveguide brush 6 is formed by a plurality of divergent optical waveguide fibres 7. The second end 5 of the optical waveguide 3 is connected to the laser beam source 2.

An optical waveguide fibre or an optical fibre is a flexible, transparent fibre that is produced by drawing glass (silicon oxide) or plastics material to a diameter that it is marginally thicker than a human hair. Optical waveguides normally contain a core that has fibres of this kind and is surrounded by a transparent casing material that has a low refractive index. Light is held in the core by the phenomenon of total reflection, as a result of which the fibres function as optical waveguides. The optical waveguide therefore functions in such a way that light is constantly totally reflected at the boundary surface between the optically thicker and the optically thinner material.

Total reflection is dependent on wavelength. Fibres that support many propagation paths or transverse modes are therefore referred to as multimode fibres (MMF), whereas those that support a single mode are referred to as single mode or monomode fibres.

Due to the flexibility of the fibres and therefore of the entire optical waveguide 3, the first end 4 of said waveguide can be freely positioned at a point of the component 8 to be treated by means of laser shock peening. Laser shock pulses emitted by the laser beam source 2 can thus be discharged into a process zone 9 of the component 8 at different points, as required, by means of the optical waveguide brush 6.

In order for laser shock treatment to lead to the desired improved material properties, the laser beam source provides an energy density and pulse duration that are suitable for laser shock pulses. Preferably, high-energy pulsed solid-state lasers are used. Typical wavelengths of laser sources of this kind are between 500 and 1200 nm.

The process parameters can vary significantly. Typically, it is necessary for the power density of the laser beam source 2 to be an essential parameter, providing a sufficient laser beam intensity, for example in the range of from 2 to 4 $GW/cm^2$. A high intensity is required to generate a plasma which leads to the desired pressure pulses. Pressure waves of 1 to 10 GPa can be generated by means of the exemplary intensities in the range of from 2 to 4 $GW/cm^2$.

The actual design of the process depends largely on the field of application. Intensity can be influenced by the power and surface area of the laser beam. A desired level of intensity can therefore be achieved by larger beam diameters, for example on large components, and, in the case of smaller beam diameters, by lower laser beam power, for example in the case of more filigree-like components. Possible parameter ranges are therefore very wide.

A suitable pulse duration can be between 1 and 40 ns, for example. The pulse energy required depends largely on the focus diameter of the laser beam. At a focus diameter of between 30 μm and 10 mm, said energy can be for example between 20 mJ and 100 J. In an exemplary set of dimensions, pulse energy is between 20 mJ and 70 mJ, beam diameter is between 0.3 mm and 0.7 mm and energy density of the laser beam is between 2.3 and 3.5 $GW/cm^2$. In a significantly larger set of dimensions but at similar intensity and a focus diameter of 1.5 mm, 2.8 J of pulse energy is conceivable. Pulses with even larger dimensions can also be in the 2-digit Joule range, for example up to 25 J at 25 ns pulse duration.

As long as sufficient beam intensity, or power density, and pulse duration are ensured, the process can therefore be as varied as possible.

Figure 7:
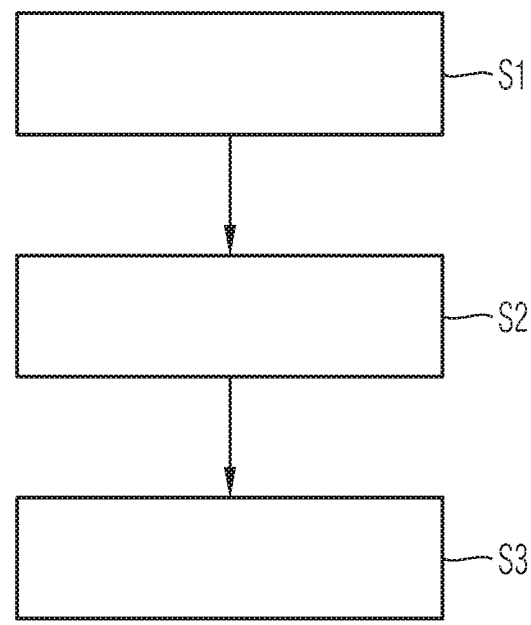
FIG. 7 is a block diagram of a method for laser shock peening.

FIG. 7 is a block diagram of a method for laser shock peening.

The method can be carried out for example by a system according to FIG. 6.

For this purpose, in a first step S1, the first end 4 of the flexible optical waveguide 3 is guided by the optical waveguide brush 6 to the point of the component 8 to be treated. In a second step, laser shock pulses are then generated by means of the laser beam source 2 which is coupled to the second end of the optical waveguide 3. In a third step S3, the laser shock pulses are then discharged into the process zone 9 by means of the optical waveguide brush.

Figure 8:
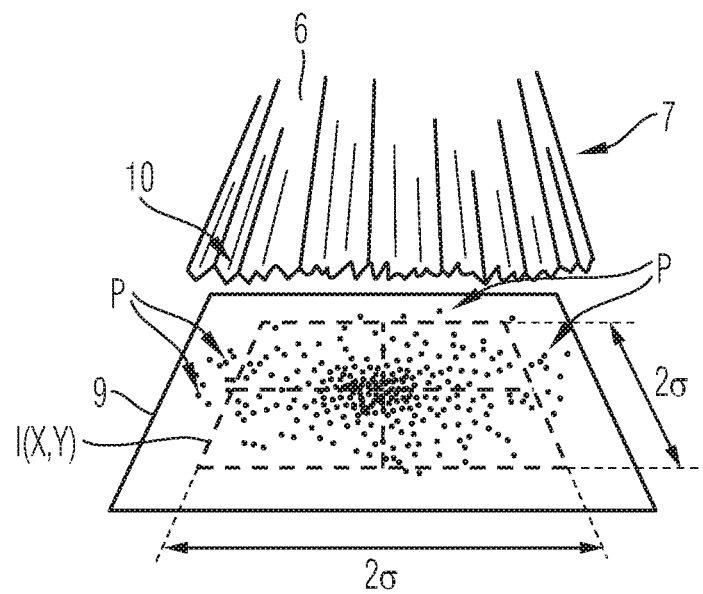
FIG. 8 schematically shows a process zone.

FIG. 8 schematically shows a process zone 9.

Starting from the optical waveguide brush 6, the fibre ends 10 of the individual optical waveguide fibres 7 are distributed in a disordered manner over the process zone 9, in particular distributed approximately normally, such that, even with respect to the distribution I(X, Y) of the individual points of impact of the laser shock pulses P discharged via the individual optical waveguide fibres 7, a gridless, disordered distribution IX,Y, in particular an approximately normal distribution, can be expected. Depending on the extent to which the optical waveguide brush is fanned-out, and the distance of the optical waveguide brush to the process zone, said zone can have larger or smaller dimensions. Within the process zone 9, there is a point to be treated which includes the particular region of the process zone 9 that, starting from a central point, is within the standard deviation σ. Within said region, a predetermined statistical saturation behaviour of the laser shock treatment can be expected.

In laser shock peening, material is compressed. Overlapping regions of the zones in question are a typical part of the process. Using the optical waveguide brush causes these overlapping regions to emerge frequently and necessarily; however, as is the case e.g. with mechanical shock hardening by means of shot peening, this does not have a negative effect. Rather, it merely increases the total treatment time for the overlapping regions.

Figure 9:
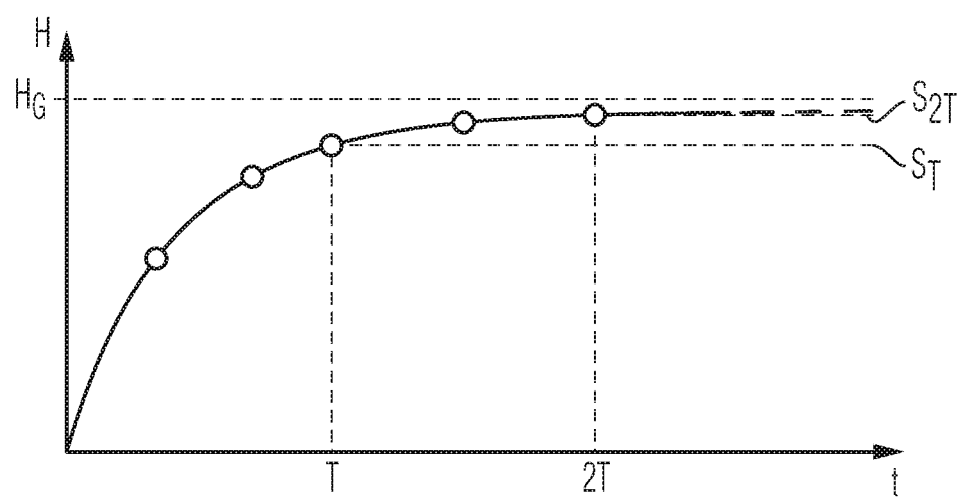
FIG. 9 schematically shows saturation behaviour.

FIG. 9 schematically shows the saturation behaviour.

In this graph, degree of hardness H is plotted qualitatively over time t. The curve of the degree of hardness H asymptotically approaches a limit value $H_G$. After a predetermined time period T, more than 80% of said limit value is reached, such that a saturation state $S_T$ is set. When there is further irradiation at the same point, although said saturation state can still be increased slightly, only a relatively low increase is achieved on account of the asymptotic approach to the limit value $H_G$. For example, after a doubled time period, a saturation state $S_{2T}$ is only approx. 10% higher.

In order to substantially achieve the desired improvement to the material properties, a laser shock treatment of this kind over the time period T is therefore sufficient. Nevertheless, a longer treatment period is safe. For the method according to the invention, this means that a point to be treated is to be treated at least over a predetermined time period T, with a potentially longer treatment period nevertheless being possible. Therefore, all of the points to be treated can be traversed by the process zone in a time-controlled manner, each of the points to be treated being within the standard deviation at least once for the time period T. Potential overlaps of the treated points are not problematic since, as demonstrated here, even a duplication of the treatment time does not significantly change the material properties. In application, the method is therefore very simple to carry out and control.

Figure 10A:
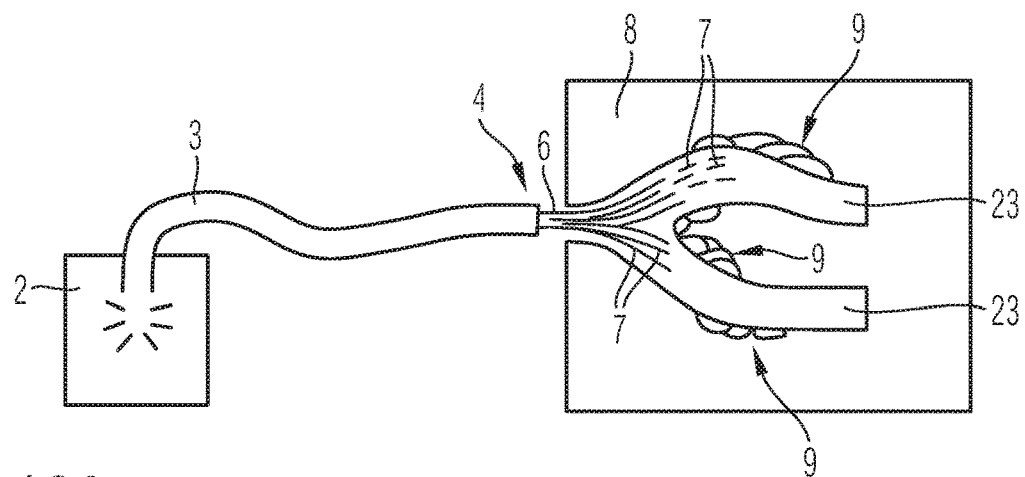
FIG. 10A schematically shows a first stage of a laser shock peening process in regions that are difficult to access.

FIG. 10A schematically shows a first stage of a laser shock peening process in regions that are difficult to access.

Laser shock treatment is performed in order to improve fatigue properties and surface properties within regions that are difficult to access; this is achieved by laser polishing or laser ablation.

The first end 4 of the optical waveguide 3 is in this case guided to the component 8 to be treated, the optical waveguide brush 6 being guided to a point 23 that is difficult to access. In this case, said point is a cavity that is partitioned internally and has a slight undercut. The individual fibres 7 of the optical waveguide brush are inserted into the cavity for this purpose. A first laser shock treatment is carried out in which the process zone 9 is still at regions that are easy to access.

The optical waveguide brush is subsequently inserted incrementally further into the cavity in a plurality of steps.

Figure 10B:
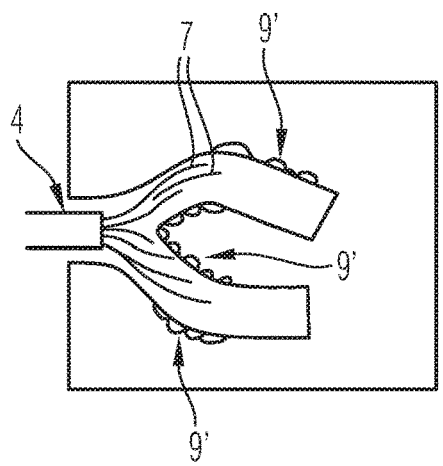
FIG. 10B shows the laser shock peening process according to FIG. 10A in a second stage.

FIG. 10B shows the laser shock treatment process according to FIG. 10A in a second stage.

In this case, the first end 4 is inserted into the cavity in order to thus move the process zone 9' further into the cavity.

Figure 10C:
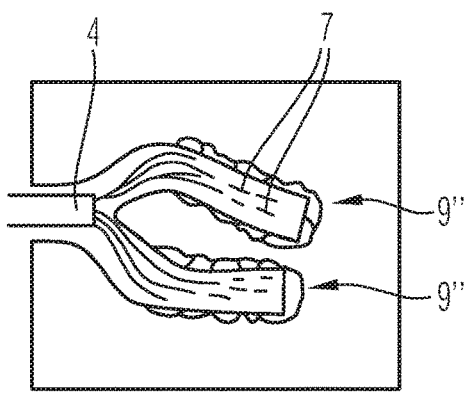
FIG. 10C shows the laser shock peening process according to FIGS. 10A and 10B in a final stage.

FIG. 10C shows the laser shock peening process according to FIGS. 10A and 10B in a final stage.

In this case, the first end 4 is now inserted as far as possible into the cavity. The individual fibres 7 extend into the undercut regions of the cavity such that the process zone 9" also extends into said undercut regions. In this way, the cavity can, despite the complex geometry thereof, be fully subjected to laser shock treatment.

In each of the method stages shown in FIG. 10A to 10C, at least one treatment time period T according to FIG. 9 is observed in order to achieve a desired saturation state $S_T$ of a hardening process across all regions.

Figure 11:
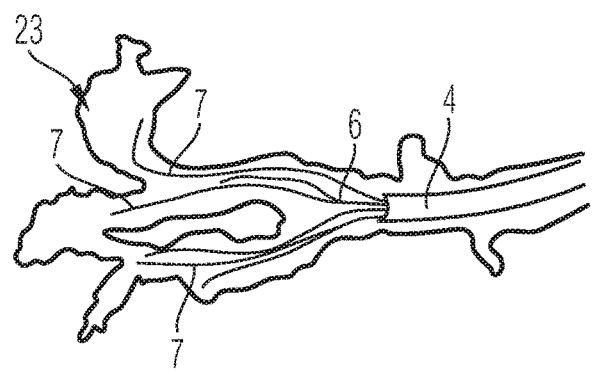
FIG. 11 schematically shows an optical waveguide being able to reach regions that are particularly difficult to access.

FIG. 11 schematically shows how it is possible for an optical waveguide brush 6 to reach regions that are particularly difficult to access.

Said figure is intended to illustrate the high degree of flexibility of the optical waveguide brush. The region 23 shown is likewise a cavity; however, in this case it is exceptionally indented and is even provided with a central island portion. Designing the optical waveguide brush 6 appropriately, e.g. in this case using correspondingly long, divergent individual optical waveguide fibres 7, said fibres can also be inserted into complex geometries of this kind and, over a treatment period of a certain time, a laser shock treatment saturation state can even be achieved here. Therefore, on account of the flexibility of the individual fibres 7, access to interior and hidden surfaces, in particular also undercut surfaces, can be achieved.

In order to achieve sufficient laser beam intensity for laser shock treatment in the process zone 9, focusing means are provided on the fibre ends 10 of the individual optical waveguide fibres 7.

By providing focusing means on the fibre ends, the position of the process zone relative to a focus 17 of the laser beam can be also be checked prior to the emission of laser shock pulses.

Focusing means of this kind can be placed, generated or installed in the form of fibre lenses or of microlenses provided on the fibre ends. Various possible embodiments exist for this purpose.

Microlenses are miniaturised diverging lenses or focusing lenses, of which the diameter is between a few micrometres and a few millimetres. In accordance with the laws of physics, light beams in microlenses are functionally broken, as is the case in normal lenses. Microlenses can be made for example from purified silicon dioxide or silicon in semiconductor processes. The lens profile can be precisely predefined by means of wafer-based production methods and the microlens can be positioned in a precise manner.

Microlenses made of purified silicon dioxide can be used for wavelengths of between 150 nm and 4 μm. The spectrum of typical technical solid-state laser beam sources, which is usually between 500 and 1200 nm, is also within said wavelength range.

Figure 12:
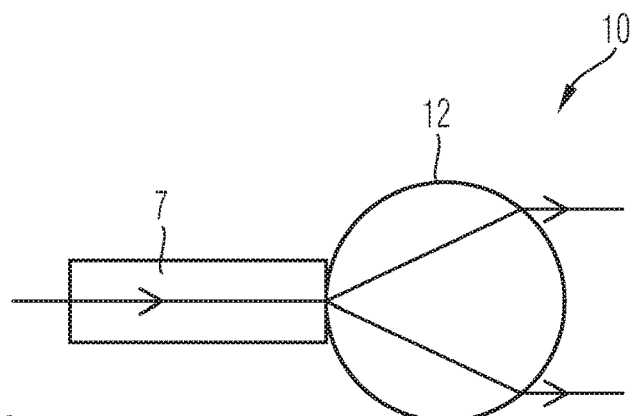
FIG. 12 is a schematic outline of a spherical lens as a focusing means.

FIG. 12 is a schematic outline of a spherical lens as a focusing means.

In said embodiment, the laser beam that widens from the optical waveguide fibres 7 is broken at a boundary surface of a spherical lens 12 and thus focused. In the embodiment shown, the focusing is such that the individual light beams emerge from the spherical lens 12 in parallel. This has the particular advantage that is not necessary to adjust a focus position of the process zone. It is therefore not dependent, at least not to a sensitive degree, on a distance between the fibre end 10 and a process zone 9. The effort required to control the position of the fibre ends 10 can therefore be significantly reduced or even rendered obsolete. However, it is of course necessary for the power output of the laser beam source 2 to be of an appropriate degree to apply a sufficiently high laser beam intensity to a beam diameter that corresponds approximately to the sphere diameter.

Figure 13:
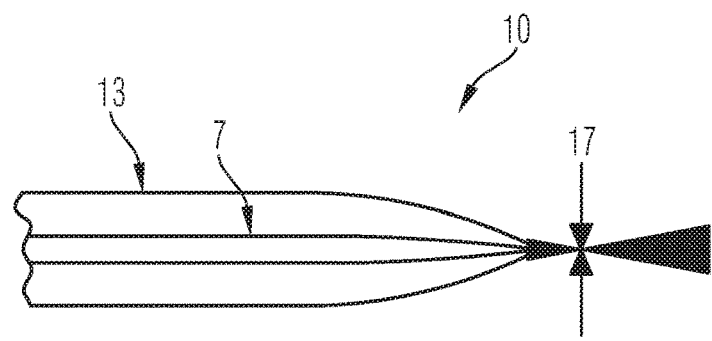
FIG. 13 schematically shows a fibre tip as a focusing means.

FIG. 13 schematically shows a fibre tip 13 as a focusing means.

A reduction of the fibre diameter at the fibre end 10 leads to a conical fibre tip 13 of the individual optical waveguide fibres 7 which focuses the laser beam into the focus 17.

Figure 14:
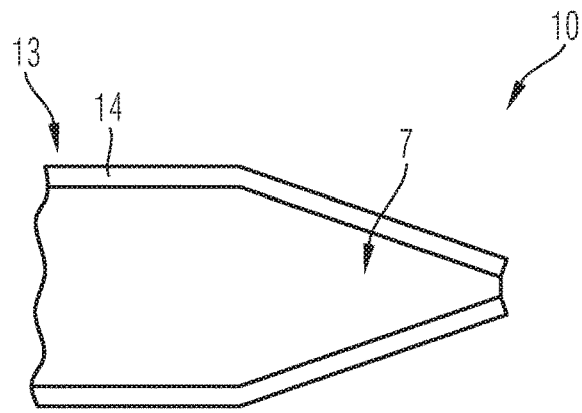
FIG. 14 schematically shows a reflection-coated fibre tip.

FIG. 14 schematically shows a reflection-coated fibre tip 13.

The fibre tip 13 is in this case provided with a reflection coating 14, preferably a metal coating. The reflection coating prevents the laser beam from decoupling prematurely. The production and use of lenses of this kind for microscopic applications is described for example by Serio, M & Zenobi, Renato & Deckert, Volker. (2003). Looking at the nanoscale: Scanning near-field optical microscopy. TrAC Trends in Analytical Chemistry. 22. 70-77. 10.1016/S0165-9936(03)00201-2, incorporated herein by reference.

Figure 15:
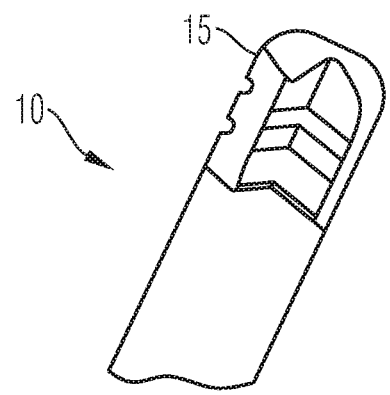
FIG. 15 schematically shows a fibre end that has a microlens printed thereon as a focusing means.
Figure 16:
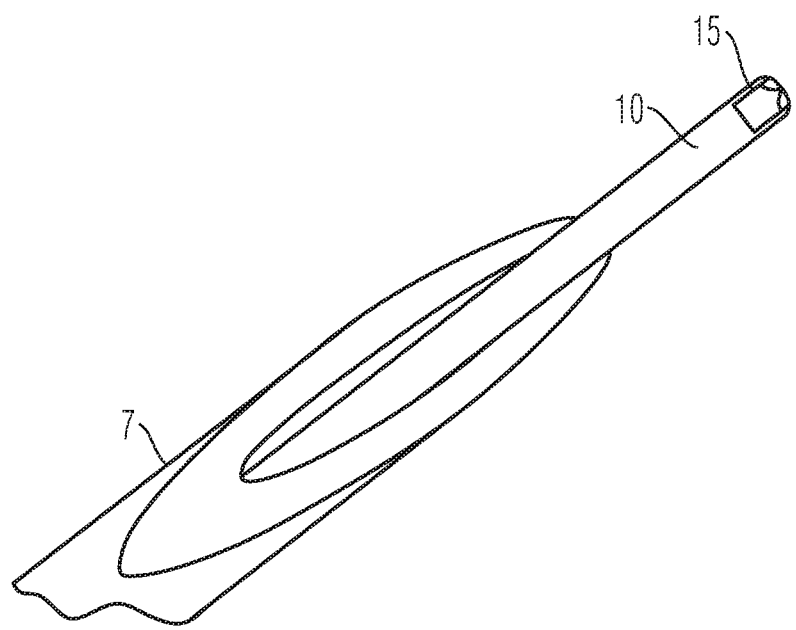
FIG. 16 shows an optical fibre that has a focusing means according to FIG. 15.

FIG. 15 schematically shows a fibre end that has a microlens printed thereon as a focusing means. FIG. 16 shows an optical waveguide fibre having a focusing means according to FIG. 15.

This is an example of a complex triplet lens which is dimensioned within the fibre diameter. Microlenses of this kind can be printed onto a monomode glass fibre, for example by means of femtosecond 3D printing, i.e. by using a femtosecond laser that has a pulse duration of less than 100 femtoseconds. However, simpler lenses can of course also be produced or printed by means of said technology. Printing technology of this kind has been developed for example by the 4$^{th}$ Physics Institute of the University of Stuttgart and published by T. Gissibl, S. Thiele, A. Herkommer, and H. Giessen: Two-photon direct laser writing of ultracompact multi-lens objectives, Nature Photonics 10 (2016). DOI: 10.1038/NPHOTON.2016.121, incorporated herein by reference, and T. Gissibl, S. Thiele, A. Herkommer, and H. Giessen: Sub-micrometre accurate free-form optics by three-dimensional printing on single-mode fibres, Nature Communications 7, 11763 (2016), incorporated herein by reference.

Figure 17:
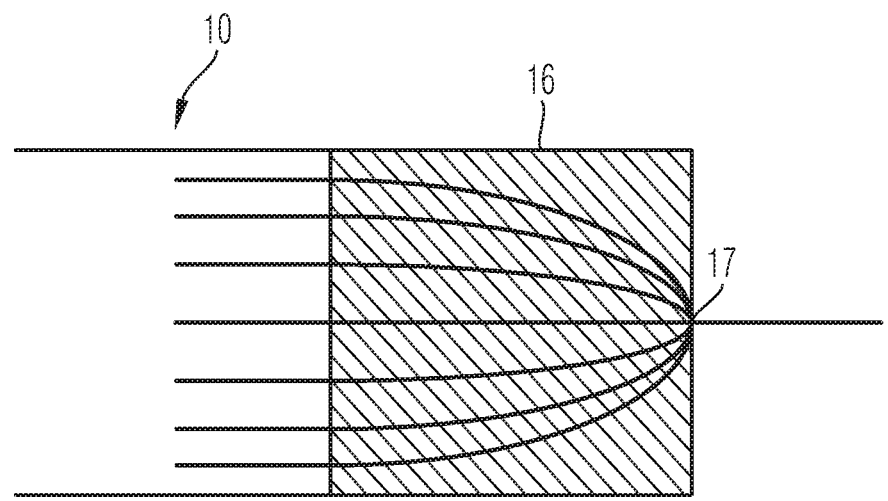
FIG. 17 shows a fibre end that has a focusing lens as a focusing means.

FIG. 17 shows a fibre end that has a focusing lens as focusing means.

A focusing lens, for example what is known as a Selfoc® lens, as marketed by Go!Foton Group, can also be used as a further focusing means that can be dimensioned within the fibre diameter. This is a lens that focuses divergent light beams of a glass fibre, the refractive index within the lens being variable. For this purpose, there are gradual differences in density within the lens which deflect the beams consistently and continuously in the direction thereof towards the focus point. The changes in refractive index are achieved for example by means of a high-temperature process in which ions are diffused into the material.

Figure 18:
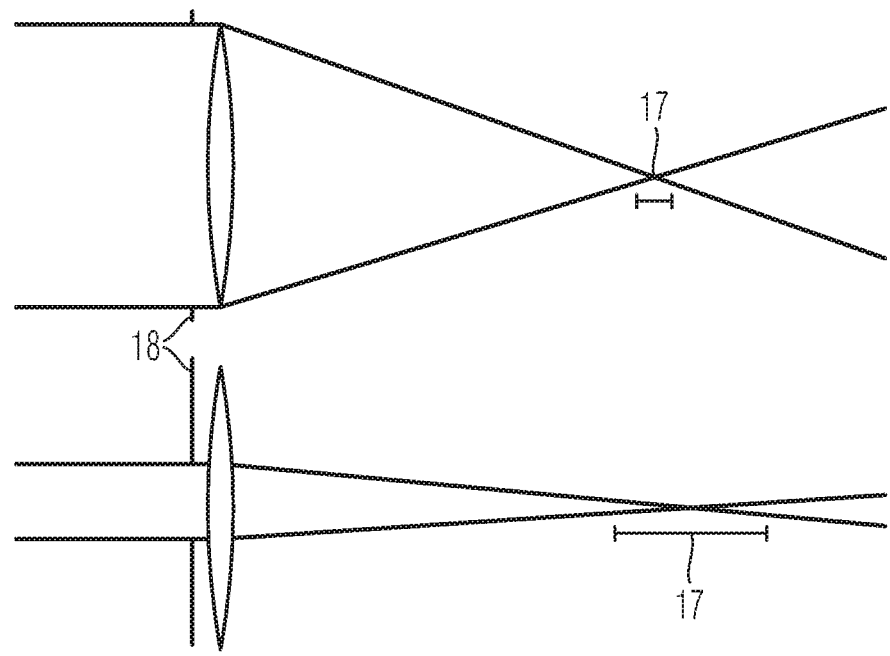
FIG. 18 schematically shows various diaphragm apertures in a focusing means for different depths of field.

FIG. 18 schematically shows various diaphragm apertures in a focusing means for different depths of field.

The fibre end 10 can also be focused by using a lens and an adjustable diaphragm 18, shown merely schematically in this case. Advantageously, the depth of field can be changed, as illustrated in this case at different diaphragm apertures with reference to the beam paths and the focuses 17 of different lengths.

The depth of field increases as the diaphragm become smaller; however, the exact value depends on the circle of confusion of the lens. The depth of focus depends on the remoteness of the object to be treated, i.e. the greater the distance, the greater the depth of focus ought to be.

Using an aperture, it would therefore be possible to individually adapt the distance to the individual fibres, or even to each individual fibre, from the point to be treated.

Figure 19:
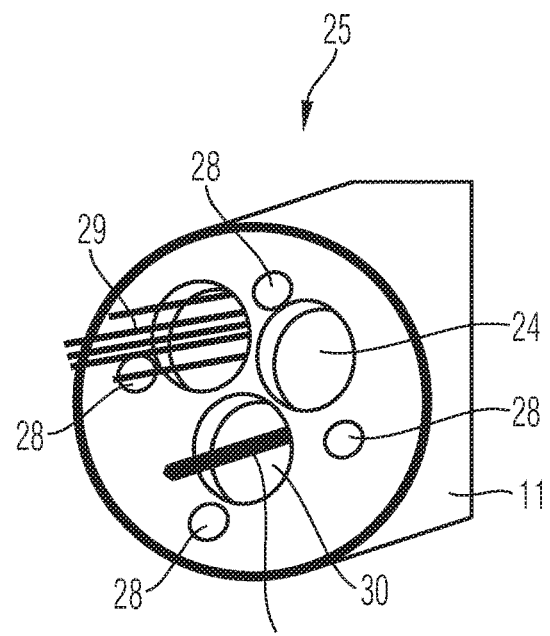
FIG. 19 is a cross-sectional view of a videoendoscope.

FIG. 19 is a cross-sectional view of a videoendoscope 25.

The videoendoscope 25 has, at the distal end of the endoscope shaft 11 thereof, a distal end portion as shown here in cross section. The end portion represents the part of the endoscope that is inserted into the body to be examined. In order to be able to ensure the highest possible degree of flexibility with respect to spatial orientation of the end portion during treatment, the endoscope shaft 11 is designed to be deflectable. By deflecting, i.e. bending, the end portion relative to the rest of the of the endoscope shaft 11, the endoscope 25 can be orientated as desired.

Typically, the end portion is bent by using Bowden cables 28, as shown here. However, other directing means, for example actuating directing means, would of course also be conceivable.

In the embodiment shown, the flexible endoscope shaft 11 together with the Bowden cables 28 form a spring damper system. The Bowden cable 28 in this case is a spring element and the friction on the Bowden cables 28 and the deflection of the distal end portion produce the damping effect. When a tensile force is applied in a proximal direction to a proximal end of a Bowden cable 28, said cable becomes shorter relative to the endoscope shaft 11 such that the flexible endoscope shaft 11 bends.

The videoendoscope 25 has an illumination channel 29, a video transmission channel 30 that has a recording device 26 in the form of a video cable, and a working channel 24. According to the invention, the optical waveguide 3 is received in the working channel 24, the first end of which waveguide protrudes together with the optical waveguide brush 6 out of the end portion of the endoscope. In this way, the optical waveguide 3 can be inserted into regions that are difficult to access and controlled therein with respect to their orientation. The optical waveguide 3 can therefore be supplied endoscopically.

Figure 20:
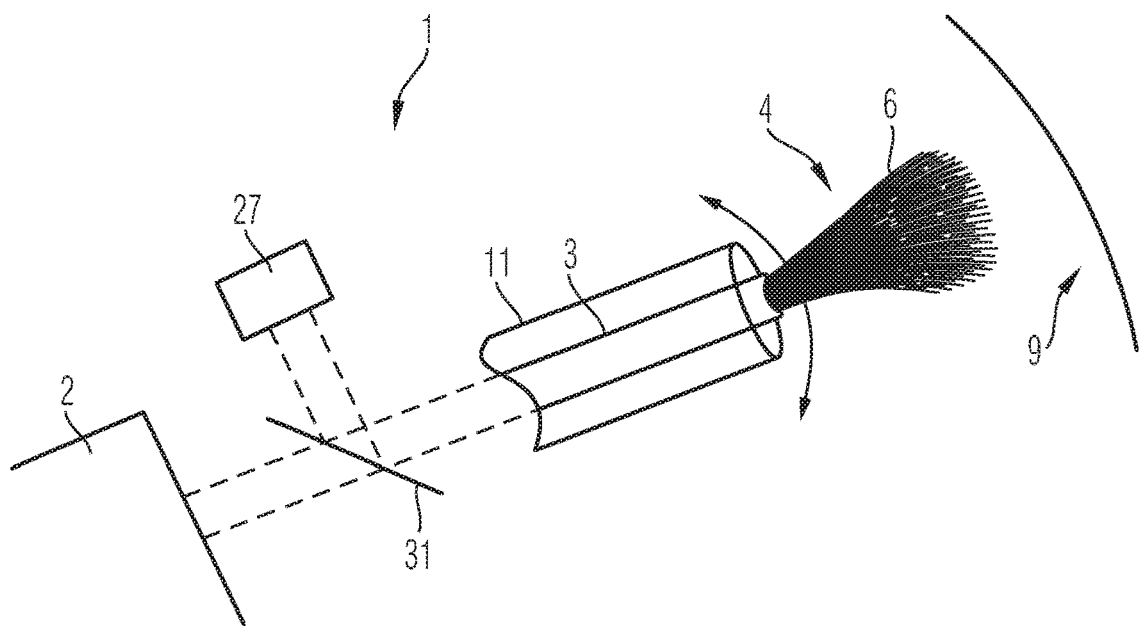
FIG. 20 schematically shows a further embodiment of a system for laser shock peening.

FIG. 20 schematically shows a further embodiment of a system for laser shock peening.

In this system, individual or all optical waveguide fibres can be used not only to transfer the laser beam but also to control the process and to analyse the treated regions. The flexible optical waveguide 3 is designed for this purpose to transmit images from the process zone 9 to a recording device 27 and also to transmit laser shock pulses from the laser beam source 2 into the process zone 9.

Accordingly, a beam splitter 31 is provided which, if required, diverts an image signal from the optical waveguide brush 6 to the recording device 27 and thus allows images to be transmitted from the process zone 9. In this way, the endoscope casing 11, which in this case has no illumination and video channel but merely a working channel, can be orientated in a targeted manner.

The image segments recorded by individual, randomly distributed fibres are analysed by means of specific algorithms and put together to form an overall image, as described in Heshmat, B. et al. Optical brush: Imaging through permuted probes. Sci. Rep. 6, 20217; DOI: 0.1038/srep20217 (2016), incorporated herein by reference. In this way, some or all of the optical waveguide fibres are used as a kind of videoendoscopy. This can be performed before and/or during laser shock peening treatment.

In contrast therewith, the recording device 27 can be further designed, starting from the first end 4 of the optical waveguide 3, to detect a focus position of the process zone 9. This can be detected for example by the sharpness of a received image. If the image is sharp, the process zone is in focus.

If, prior to treatment, a focus position for the desired process zone 9 is occupied, the beam splitter 31, in so far as it is necessary for protecting the recording device 27 from laser radiation, is shifted to be fired upon by laser beams. Subsequently, laser shock pulses are generated by the laser beam source 2, coupled into the flexible optical waveguide 3 and discharged by the optical waveguide brush 6 into the process zone 9 for laser shock treatment.

Figure 21:
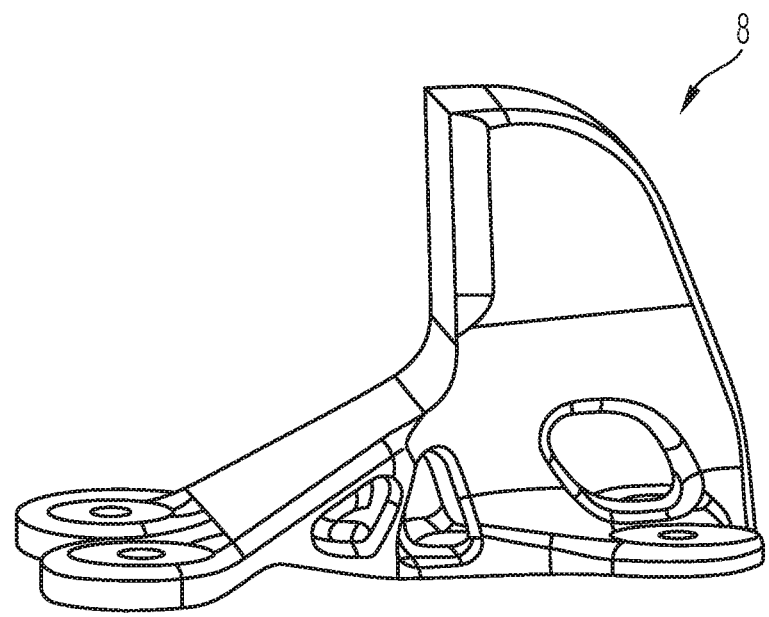
FIG. 21 is a perspective view of a complexly formed component.

FIG. 21 is a perspective view of a complexly formed component.

It shows in a purely exemplary manner what is known as a doorstop of an aircraft or spacecraft, which is produced by additive manufacturing, in particular by 3D printing from titanium.

Figure 22:
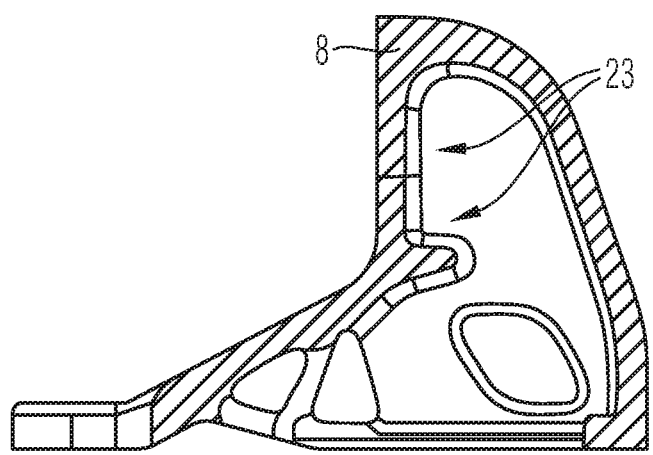
FIG. 22 is a cross-sectional view of undercut regions in the cavity in the component according to FIG. 21.

FIG. 22 is cross-sectional view of undercut regions in the cavity in the component according to FIG. 21.

Since the doorstop is formed so as to have an optimised topology, it has a complexly formed cavity that has an undercut region 23; this can be produced by additive manufacturing. Said cavity cannot be treated by conventional blasting methods since it is not possible for conventional laser optics to enter said cavity.

Figure 23:
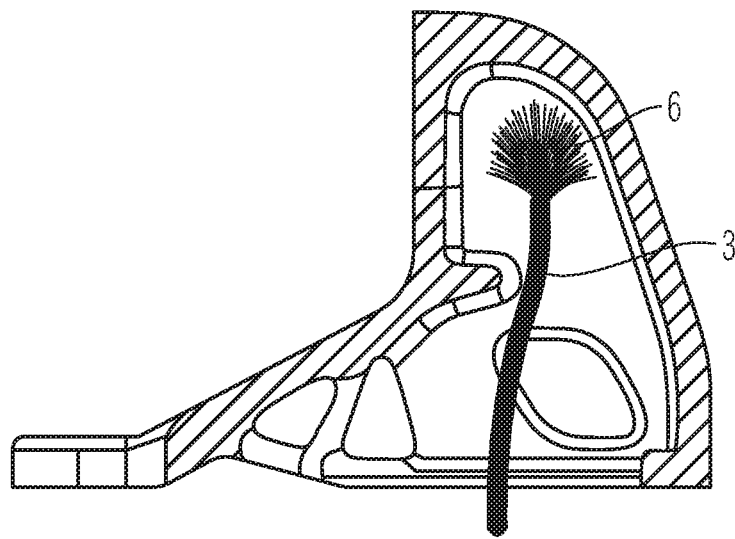
FIG. 23 is the cross-sectional view according to FIG. 22 with an optical waveguide brush inserted into the cavity.

FIG. 23 is the cross-sectional view according to FIG. 22 with an optical waveguide brush inserted into the cavity.

Together with the optical waveguide brush 6 inserted endoscopically according to FIG. 19 or 20, the optical waveguide 3 can be inserted into the cavity and, therein, treat the inner walls of the cavity in a targeted manner by means of laser shock peening, until a desired saturation state is achieved.

Figure 24:
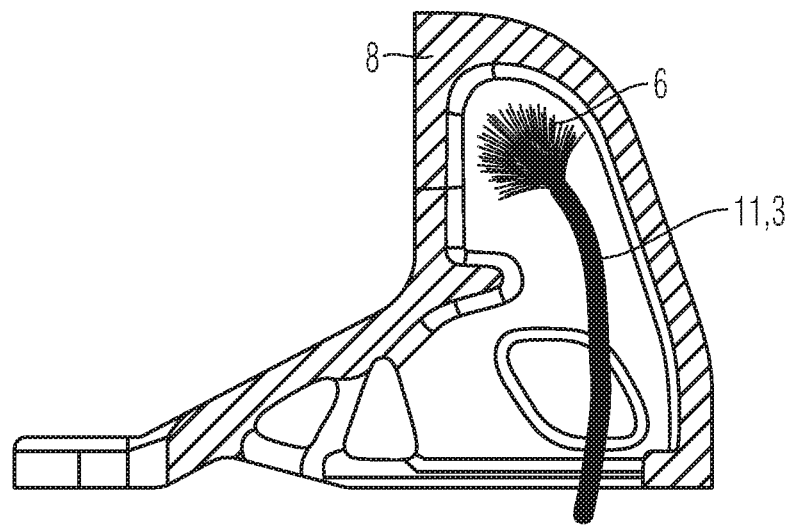
FIG. 24 shows the optical waveguide brush according to FIG. 23 in an inclined state in the undercut region.

FIG. 24 shows the optical waveguide brush according to FIG. 23 in an inclined state in the undercut region.

The first end of the optical waveguide 3 received in an endoscope shaft 11 can subsequently be orientated into an undercut region 23 by means of bending the endoscope shaft 11 and laser shock peening can likewise be performed in said region.

The optical waveguide brush 6 is thus used, in conjunction with a flexible optical waveguide 3 guided in an endoscope shaft 11, in components that are additively manufactured, for the purpose of laser shock peening regions 23 of a three-dimensional component 8 that are difficult to access and are undercut.

Figure 25:
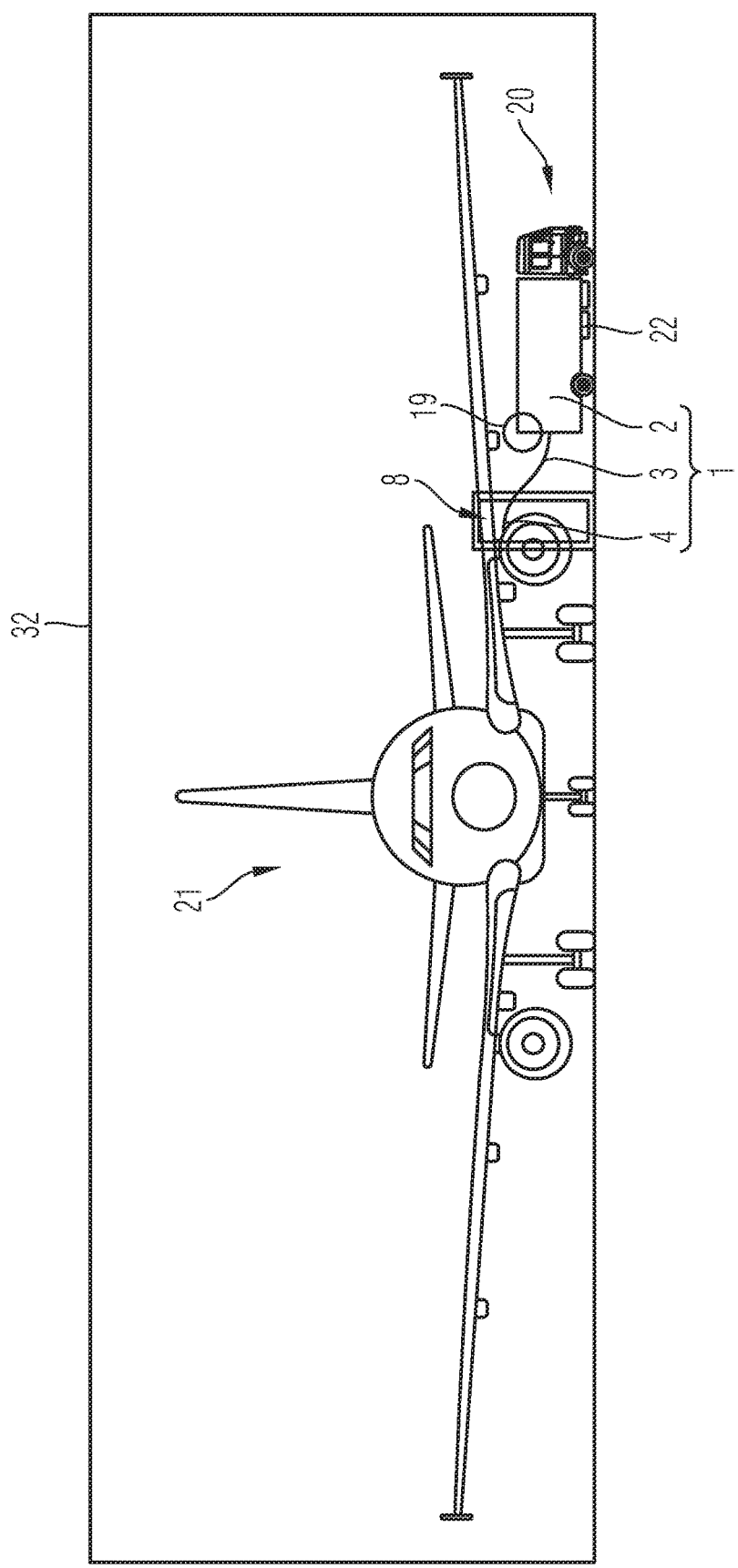
FIG. 25 schematically shows a maintenance situation of an aircraft or spacecraft using a mobile laser shock treatment station.

FIG. 25 schematically shows a maintenance situation of an aircraft or spacecraft using a mobile laser shock treatment station 20.

The mobile laser shock treatment station 20 is designed to carry out repairs or retrofitting by means of laser shock peening on aircraft or spacecraft 21. For this purpose, said station has a mobile vehicle 22 by means of which the laser beam source 2 and the optical waveguide 3 can be transported to the component 8 to be treated on the aircraft or spacecraft 21. The vehicle 22 is positioned for this purpose at a point that is as close to the component 8 as possible, shown here in an exemplary manner on the ground below or next to the aircraft or spacecraft 21.

The flexible optical waveguide 3 is rolled up into an optical waveguide roll 19 and, if required, can be flexibly unrolled. The first end 4 of the optical waveguide 3, starting from the laser beam source 2 that can be transported by the vehicle 22, can be flexibly supplied to a point of the component 8 to be treated by means of laser shock peening.

Purely by way of exemplary illustration, a maintenance frame is assembled here at an engine of the aircraft or spacecraft 21, to which frame the flexible optical waveguide 3 is supplied. Laser shock peening can then be flexibly performed, as required, in the region of the maintenance frame which is preferably covered by laser protection measures. The treatment can of course also be performed at any other point of the aircraft or spacecraft, as required.

As an alternative to local laser protection cover, the hangar 32 which is shown schematically surrounding the aircraft or spacecraft 21 can also be designed as a laser protection cell.

In this way, the optical waveguide brush can be flexibly used by means of a mobile laser shock treatment station 20 for carrying out repairs or retrofitting on aircraft or spacecraft 21 by means of laser shock peening.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for laser shock peening of a component, comprising:
   supplying a first end of a flexible optical waveguide, the first end being configured in the form of an optical waveguide brush having a plurality of divergent optical waveguide fibres, to a point of the component to be treated by laser shock peening;
   generating laser shock pulses coupled in at a second end of the optical waveguide, by a laser beam source; and
   discharging the laser shock pulses by the optical waveguide brush into a process zone at the point of the component to be treated,
   wherein the individual optical waveguide fibres each have focusing means and the position of the process zone relative to a focus of the laser beam is checked prior to the emission of laser shock pulses.

2. The method of claim 1, wherein the laser shock pulses are discharged for a predetermined time period at the point of the component to be treated, until a predetermined saturation state of a laser shock treatment is reached.

3. The method of claim 1, wherein the fibre ends of the plurality of divergent optical waveguide fibres of the optical waveguide brush have a disordered distribution and the laser shock pulses are discharged into the process zone in accordance with the disordered distribution.

4. The method of claim 3, wherein the distribution is gridless.

5. The method of claim 1, wherein the optical waveguide is guided in an endoscope shaft at least in portions and the supply is performed endoscopically.

6. The method of claim 1, wherein the supply comprises:
   positioning a mobile vehicle, which transports the laser beam source, close to the component to be treated; and
   flexibly supplying the first end of the optical waveguide from the laser beam source to the point of the component to be treated by laser shock peening.

7. The method of claim 6, wherein flexibly supplying the first end of the optical waveguide from the laser beam source is realized by flexibly unrolling the waveguide from an optical waveguide roll.

8. The method of claim 1, wherein the method is configured for laser shock peening of a component at points that are difficult to access.

9. A system for laser shock peening of a component comprising:
- a laser beam source configured to provide an energy density and pulse duration suitable for laser shock pulses;
- a flexible optical waveguide having a first end and a second end, wherein the first end has an optical waveguide brush having a plurality of divergent optical waveguide fibres and the second end configured to be connected to the laser beam source in order to couple in laser shock pulses,
- wherein the first end of the optical waveguide is configured to be flexibly positioned at a point of the component to be treated by laser shock peening, such that laser shock pulses emitted by the laser beam source are discharged by the optical waveguide brush into a process zone at the point of the component to be treated, and
- wherein the optical waveguide fibres of the optical waveguide brush each comprises, at the individual fibre ends, focusing means.

10. The system of claim 9, wherein the flexible optical waveguide is configured to be guided in an endoscope shaft at least in portions.

11. The system of claim 9, wherein each fiber end comprises the focusing means formed within a fibre diameter.

12. The system of claim 9, wherein the flexible optical waveguide is configured to be guided in a working channel of a videoendoscope having a recording device, or
  wherein the flexible optical waveguide is configured to transmit images from the process zone to a recording device and to transmit laser shock pulses from the laser beam source into the process zone.

13. The system of claim 12, wherein the recording device is configured, proceeding from the first end of the optical waveguide, to detect a focal position of the process zone.

14. A mobile laser shock treatment station for carrying out repairs or retrofitting by laser shock peening which station has a mobile vehicle and a system for laser shock peening of a component, the system comprising:
- a laser beam source which configured to provide an energy density and pulse duration suitable for laser shock pulses;
- a flexible optical waveguide having a first end and a second end, wherein the first end has an optical waveguide brush having a plurality of divergent optical waveguide fibres and the second end configured to be connected to the laser beam source in order to couple in laser shock pulses,
- wherein the first end of the optical waveguide is configured to be flexibly positioned at a point of the component to be treated by laser shock peening, such that laser shock pulses emitted by the laser beam source are discharged by the optical waveguide brush into a process zone at the point of the component to be treated, and
- wherein the optical waveguide fibres of the optical waveguide brush each comprises, at the individual fibre ends, focusing means.

15. The mobile laser shock treatment station of claim 14, wherein the station is configured for carrying out repairs or retrofitting by laser shock peening on aircraft or spacecraft.

16. The mobile laser shock treatment station of claim 15, wherein the laser beam source is configured to be transported by the mobile vehicle to the component to be treated and the first end of the optical waveguide is configured to be flexibly supplied from the laser beam source to a point of the component to be treated by laser shock peening.

17. The mobile laser shock treatment station of claim 16, wherein the first end of the optical waveguide is configured to be flexibly supplied as the optical waveguide is unwound from an optical waveguide roll.

* * * * *